United States Patent
Fujii et al.

(10) Patent No.: US 11,097,374 B2
(45) Date of Patent: Aug. 24, 2021

(54) FRICTION STIR WELDING TOOL MEMBER MADE OF SILICON NITRIDE SINTERED BODY, AND FRICTION STIR WELDING APPARATUS USING THE SAME

(71) Applicants: OSAKA UNIVERSITY, Suita (JP); TOSHIBA MATERIALS CO., LTD., Yokohama (JP)

(72) Inventors: Hidetoshi Fujii, Ibaraki Osaka (JP); Yoshiaki Morisada, Ibaraki Osaka (JP); Kai Funaki, Kanagawa (JP); Isao Ikeda, Kanagawa (JP); Yutaka Abe, Kanagawa (JP); Masahiro Kato, Kanagawa (JP)

(73) Assignees: OSAKA UNIVERSITY, Suita (JP); TOSHIBA MATERIALS CO., LTD., Yokohama (JP)

( * ) Notice: Subject to any disclaimer, the term of this patent is extended or adjusted under 35 U.S.C. 154(b) by 165 days.

(21) Appl. No.: 16/324,108

(22) PCT Filed: Aug. 4, 2017

(86) PCT No.: PCT/JP2017/028457
§ 371 (c)(1),
(2) Date: Feb. 7, 2019

(87) PCT Pub. No.: WO2018/030308
PCT Pub. Date: Feb. 15, 2018

(65) Prior Publication Data
US 2019/0168337 A1    Jun. 6, 2019

(30) Foreign Application Priority Data

Aug. 9, 2016   (JP) .............................. JP2016-156383

(51) Int. Cl.
*B23K 20/12* (2006.01)
*C04B 35/584* (2006.01)
(Continued)

(52) U.S. Cl.
CPC .......... *B23K 20/1255* (2013.01); *B23K 20/12* (2013.01); *C04B 35/584* (2013.01);
(Continued)

(58) Field of Classification Search
CPC .. B23K 20/1255; B23K 20/125; B23K 20/12; B23K 20/122
See application file for complete search history.

(56) References Cited

U.S. PATENT DOCUMENTS

2011/0104515 A1\* 5/2011 Kou ........................ C22C 23/02
428/649
2013/0068825 A1\* 3/2013 Rosal ..................... B23K 20/26
228/114
(Continued)

FOREIGN PATENT DOCUMENTS

CN   1727307 A      2/2006
JP   H05-238830 A   9/1993
(Continued)

*Primary Examiner* — Erin B Saad
(74) *Attorney, Agent, or Firm* — Foley & Lardner LLP

(57) ABSTRACT

The friction stir welding tool member according to the present invention is made of a silicon nitride sintered body, wherein the silicon nitride sintered body contains 15% by mass or less of additive components except silicon nitride in such a manner that the additive components include at least one element selected from lanthanoid elements and at least one element selected from Mg, Ti, Hf, and Mo. In addition, it is preferable that the additive components further include at least one element selected from Al, Si, and C. According to the above-described configuration, a friction stir welding tool member having an excellent durability can be provided.

14 Claims, 1 Drawing Sheet

(51) Int. Cl.
  *C04B 35/587* (2006.01)
  *C04B 35/626* (2006.01)
  *C04B 35/63* (2006.01)
  *C04B 35/645* (2006.01)
  *B23K 103/04* (2006.01)

(52) U.S. Cl.
  CPC ........ C04B 35/587 (2013.01); C04B 35/6261 (2013.01); C04B 35/6303 (2013.01); C04B 35/6455 (2013.01); *B23K 2103/04* (2018.08); *C04B 2235/3222* (2013.01); *C04B 2235/3224* (2013.01); *C04B 2235/3229* (2013.01); *C04B 2235/3232* (2013.01); *C04B 2235/3244* (2013.01); *C04B 2235/3826* (2013.01); *C04B 2235/3839* (2013.01); *C04B 2235/3865* (2013.01); *C04B 2235/3878* (2013.01); *C04B 2235/5436* (2013.01); *C04B 2235/85* (2013.01)

(56) References Cited

U.S. PATENT DOCUMENTS

| | | | |
|---|---|---|---|
| 2013/0341376 A1* | 12/2013 | Miyazaki | B23K 20/1255 228/2.1 |
| 2014/0069986 A1* | 3/2014 | Okada | B23K 20/123 228/112.1 |
| 2017/0297141 A1 | 10/2017 | Ikeda et al. | |

FOREIGN PATENT DOCUMENTS

| | | |
|---|---|---|
| JP | H09-142935 A | 6/1997 |
| JP | 2010-194591 A | 9/2010 |
| JP | 2011-016716 A | 1/2011 |
| JP | 2011-098842 A | 5/2011 |
| WO | WO-2016/047376 A1 | 3/2016 |

\* cited by examiner

FRICTION STIR WELDING TOOL MEMBER MADE OF SILICON NITRIDE SINTERED BODY, AND FRICTION STIR WELDING APPARATUS USING THE SAME

TECHNICAL FIELD

The embodiments described below relate to a friction stir welding tool member made of a silicon nitride sintered body and a friction stir welding apparatus using the same.

BACKGROUND ART

The friction stir welding (FSW) is a welding method for integrating plural members under frictional heat by pressing a welding tool member called a probe against the plural members while the welding tool member is being rotated at a high speed. In the friction stir welding method, a member (i.e., base member) is softened by the frictional heat, the periphery of the welding portion is subjected to plastic flow by the torque of the probe, and thus the plural members (i.e., the base member and its mating member) can be integrally bonded (welded). Accordingly, the friction stir welding can be said to be a type of solid-phase welding.

The friction stir welding is a solid-phase welding and thus heat input to the welding portion is small. Hence, in the friction stir welding, the degree of softening and/or distortion of a welding object is small. Since any bonding brazing material is not used, a cost reduction is expected. The welding tool member used in the friction stir welding is required to have both of the wear resistance capable of withstanding the high-speed rotation and the heat resistance capable of withstanding the frictional heat.

As a conventional welding tool member, Japanese Patent Laid-Open No. 2011-98842 (Patent Document 1) discloses a welding tool member using a silicon nitride sintered body. The silicon nitride sintered body disclosed in Patent Document 1 includes cBN (cubic boron nitride), SiC (silicon carbide), and TiN (titanium nitride) in a content as large as 20 vol. %.

Although the welding tool member formed of the silicon nitride sintered body of Patent Document 1 is improved in wear resistance to a certain degree, further improvement has been demanded. In the case of the welding tool member in which cBN (cubic boron nitride), SiC (silicon carbide), and TiN (titanium nitride) are added in a content as large as 20 vol. % as disclosed in Patent Document 1, it has been revealed to have difficult sinterability and to be unable to obtain any dense sintered body, and thus the wear resistance of the silicon nitride sintered body becomes insufficient.

On the other hand, according to International Publication No. WO2016/047376 (Patent Document 2), there is a description on a friction stir welding tool member made of a silicon nitride sintered body in which amount of sintering aids is set to 15% by mass or less and this friction stir welding tool member has been developed. Reduction in sintering-aid amount has been achieved by using a predetermined combination of sintering aids.

PRIOR ART DOCUMENTS

Patent Document

Patent Document 1: Japanese Patent Laid-Open No. 2011-98842
Patent Document 2: International Publication No. WO2016/047376

SUMMARY OF THE INVENTION

Problems to be Solved by the Invention

Patent Document 2 discloses a silicon nitride sintered body having satisfactory values for both Vickers hardness and a fracture toughness value. As a result, its performance is improved as a friction stir welding tool member. However, it was not necessarily satisfactory from the viewpoint of long-term life. As a result of investigating this cause, it has been confirmed that oxidation resistance is lowered by using yttrium (Y) as a sintering aid.

In view of the above-described problem, an object of the present invention is to provide a friction stir welding tool member made of a silicon nitride sintered body which is excellent in the oxidation resistance. When such a welding tool member is used, deterioration due to the oxidation can be effectively prevented.

Means for Solving the Problems

A friction stir welding tool member according to one embodiment is a friction stir welding tool member made of a silicon nitride sintered body, wherein the silicon nitride sintered body contains 15% by mass or less of additive components other than silicon nitride in such a manner that the additive components include at least one element selected from lanthanoid elements and at least one element selected from Mg, Ti, Hf, and Mo.

DESCRIPTION OF EMBODIMENTS

Figure 1:
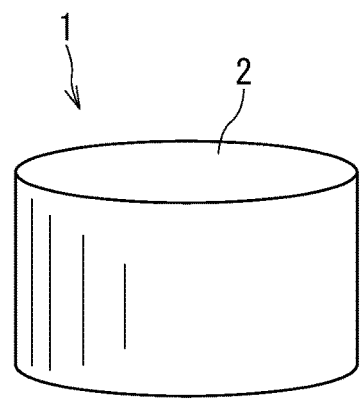
FIG. 1 is a perspective view illustrating a columnar-type friction stir welding tool member.

A friction stir welding tool member according to one embodiment is a friction stir welding tool member made of a silicon nitride sintered body, wherein the silicon nitride sintered body contains 15% by mass or less of additive components other than silicon nitride in such a manner that the additive components includes at least one element selected from lanthanoid elements and at least one element selected from Mg, Ti, Hf, and Mo.

The silicon nitride sintered body contains 15% by mass or less of additive components. An additive component means a component other than silicon nitride. In the silicon nitride sintered body, an additive component other than silicon nitride means a sintering aid component. The sintering aid component constitutes the grain boundary phase. When an amount of the additive components exceed 15% by mass, the grain boundary phase becomes excessive. The silicon nitride sintered body adopts a structure in which elongated β-silicon nitride crystal grains are complicatedly intertwined. When the amount of the sintering aid component is increased, it is undesirable because some portions cannot take the above-described structure in which silicon nitride crystal grains are complicatedly intertwined.

In addition, the amount of the additive components is preferably 3% by mass or more and 12.5% by mass or less. More preferably, the amount of the additive components is 5% by mass or more and 12.5% by mass % or less. When the amount of the additive components is less than 3% by mass, there is a possibility that an amount of the grain boundary phase becomes too small and the density of the silicon nitride sintered body decreases. When the amount of the additive components is regulated to 3% by mass or more, the relative density of the sintered body can be easily formed to be 95% or more. Further, when the amount of the additive components is regulated to 5% by mass or more, the relative density of the sintered body can be easily formed to be 98% or more.

In addition, the friction stir welding tool member is characterized in that the additive components includes at least one element selected from lanthanoid elements and at least one element selected from Mg, Ti, Hf, and Mo.

Concrete examples of the lanthanoid elements may include La (lanthanum), Ce (cerium), Pr (praseodymium), Nd (neodymium), Pm (promethium), Sm (samarium), Eu (europium), Gd (gadolinium), Tb (Terbium), Dy (dysprosium), Ho (holmium), Er (erbium), Tm (thulium), Yb (ytterbium), and Lu (lutetium). These lanthanoid elements are elements capable of forming a grain boundary phase which has better oxidation resistance than Y (yttrium).

Among the various lanthanoid elements, at least one element selected from Yb, Er, Lu, and Ce is preferable. These elements are excellent in oxidation resistance under a high temperature environment. In the friction stir welding, the tool member is subjected to a high temperature environment of 800° C. or higher depending on the welding conditions. By improving the oxidation resistance under a high temperature environment, a long-term life characteristic can be improved.

In addition, the contained amount (addition amount) of the lanthanoid element(s) is preferably in the range of 1 to 10% by mass in terms of metal simple substance. When the contained amount of the lanthanoid elements is less than 1% by mass, improvement in oxidation resistance becomes small. In contrast, when the contained amount of the lanthanoid elements exceeds 10% by mass, an amount of the grain boundary phase becomes excessive and the strength as a sintered body may be disadvantageously lowered.

Further, the additive components contain at least one element selected from Mg, Ti, Hf, and Mo. The existence form is not limited as long as it contains Mg (magnesium), Ti (titanium), Hf (hafnium), or Mo (molybdenum) as a constituent element. For instance, oxides (inclusive of composite oxides), nitrides (inclusive of composite nitrides), oxynitrides (inclusive of composite oxynitrides), and carbides (inclusive of composite carbides) can be used. These elements can form a composite compound with the lanthanoid elements and strengthen the grain boundary phase. Further, by being present as nitrides, oxides, or carbides, the hardness of the grain boundary phase can be increased.

An element selected from Mg, Ti, Hf, and Mo is an element for improving sinterability. When the sinterability is improved, a densified silicon nitride sintered body can be obtained. In addition, these elements become components that strengthen the grain boundary phase. Further, the contained amount of the element(s) selected from Mg, Ti, Hf, and Mo is preferably in the range of 0.1 to 5% by mass in terms of metal simple substance. When the contained amount is less than 0.1% by mass, the effect of addition is small. In contrast, when the contained amount exceeds 5% by mass, there is a possibility of causing segregation. As the segregation increases, the wear resistance decreases.

It is also preferable that at least one selected from Al, Si and C is contained as an additive component. An element selected from Al, Si, and C functions as a component that strengthens the grain boundary phase. Strengthening the grain boundary phase leads to higher hardness of the sintered body. When the above element is added as a sintering aid, the above element may be added in the form of oxides (inclusive of composite oxides), nitrides (inclusive of composite nitrides), oxynitrides (inclusive of composite oxynitrides), and carbides (inclusive of composite carbides). Additionally, the above element may also be a composite compound with an element selected from a lanthanoid element, Mg, Ti, Hf, and Mo.

The contained amount of at least one element selected from Al, Si, and C is preferably in the range of 0.1 to 10% by mass in terms of metal simple substance. When the contained amount is less than 0.1% by mass, the effect of addition is small. In contrast, when the contained amount exceeds 10% by mass, the grain boundary phase becomes excessive. Al and Si are components that form complex oxides (inclusive of oxynitrides) with a lanthanoid element, Mg, and Hf. This composite oxide can be made into a crystalline compound, and it is possible to further increase the hardness of the grain boundary phase.

In addition, C is an element which is easy to form carbides (inclusive of complex carbides, oxycarbides, carbonitrides) with Ti, Hf, Mo, and Si. These carbides become crystalline compounds. Thereby, the grain boundary phase can be strengthened, and further higher hardness can be achieved.

It is preferable to add the above-described additive components as a sintering aid such that the total amount is 15% by mass or less. When the above-described additive components are added as a sintering aid, they are preferably added as oxides (inclusive of complex oxides), nitrides (inclusive of complex nitrides), and/or carbides (inclusive of complex carbides).

In the case of lanthanoid elements, lanthanoid oxides are preferred. Specifically, Yb is added as $Yb_2O_3$, Er is added as $Er_2O_3$, Lu is added as $Lu_2O_3$, and Ce is added as $CeO_2$.

In a case where a Mg component is added, MgO or $MgO.Al_2O_3$ spinel is preferably used. The element selected from Ti, Hf, and Mo can be added as at least one of oxides, nitrides, and carbides thereof. Ti is preferably added as $TiO_2$ (titanium oxide). The grain boundary phase can be strengthened by changing $TiO_2$ (titanium oxide) to TiN (titanium nitride) in the sintering step. In addition, Hf is preferably added as $HfO_2$ (hafnium oxide). $HfO_2$ (hafnium oxide) reacts with the lanthanoid element so as to form a crystalline compound, whereby the grain boundary phase can be strengthened. In addition, Mo is preferably added as $Mo_2C$ (molybdenum carbide). $Mo_2C$ becomes a component which strengthens the grain boundary phase without change. Further, since $Mo_2C$ has satisfactory lubricity, $Mo_2C$ is particularly effective for improving wear resistance of the sintered body.

In the case of using the element Al, aluminum oxide ($Al_2O_3$), aluminum nitride (AlN), and $MgO.Al_2O_3$ spinel are preferable. In the case of $MgO.Al_2O_3$ spinel, both Al and Mg can be added at once. In the case of the element Si, silicon oxide ($SiO_2$) and silicon carbide (SiC) are preferable. With regard to the element C, it is preferable to add the element C as silicon carbide (SiC), titanium carbide (TiC), or titanium carbonitride (TiCN).

When the sintering aid components are selected from the above-described combinations, it is possible to improve the sintering property, to prevent coarsening of silicon nitride crystal grains, and to form a crystal structure in which β-silicon nitride crystal grains are complicatedly intertwined. Additionally, when the lanthanoid element is used, the oxidation resistance of the sintered body can be improved.

Further, the maximum diameter of the grain boundary phase is preferably 1 µm or less. Moreover, when the concentration distribution of the lanthanoid elements in individual grain boundary phases was analyzed by TEM for a unit area of 5 µm×5 µm, the variation (i.e., dispersion) of the lanthanoid element concentration of individual grain boundary phases is preferably within ±20% with respect to the average value.

Measurement of the maximum diameter of the grain boundary phase and measurement of the variation in the lanthanoid element concentration are performed by element mapping of TEM (transmission electron microscope). That is, an arbitrary cross-section of the silicon nitride sintered body is observed by TEM. A sample obtained by processing its thickness to about 30 µm is prepared, then carbon is deposited on the sample surface, and this sample is used as the measurement sample. In addition, the TEM is set to an acceleration voltage of 200 kV. Further, color mapping analysis is performed in combination with EDS (Energy Dispersive X-ray Spectrometer). Composition analysis of the grain boundary phase is possible by using a FE-SEM (Field Emission Scanning Electron Microscope). The acceleration voltage of the FE-SEM is set to 200 kV.

Color mapping of lanthanoid elements within a unit area of 5 µm×5 µm is performed by using the TEM. The longest diagonal line of each lanthanoid element region is defined as the maximum diameter. It is preferable that the maximum diameter of every lanthanoid element region being present in the unit area 5 µm×5 µm is 1 µm or less. The fact that the maximum diameter of the lanthanoid element region is 1 µm or less means that the maximum diameter of the grain boundary phase is 1 µm or less. In addition, the maximum diameter of the grain boundary phase is preferably 1 µm or less, more preferably 0.8 µm or less. When the grain boundary phase is formed to have the maximum grain-boundary-phase diameter of 1 µm or less, thus resulting into an improvement in friction coefficient of the sintered body.

Further, when the color mapping of the lanthanoid elements is performed, the lanthanoid elements are mapped with color density corresponding to the lanthanoid element concentration. The average value is calculated for the respective concentration values of all the lanthanoid element regions that are present in the unit area of 5 µm×5 µm. With respect to this average value, individual lanthanoid element concentration variations are within ±20%. By using a color mapping function in accordance with concentration (i.e., color shade that matches lanthanide element concentration), it is possible to measure concentration variation (i.e., dispersion in concentration). The fact that the concentration variation of the lanthanoid element in individual grain boundary phases is small indicates that composition of the grain boundary phases homogeneous.

In addition, when the color mapping is performed on the additive elements other than lanthanoid elements, other elements are also detected in the regions where the lanthanoid elements are present. For instance, when lanthanoid compounds and Hf compounds are added as sintering aids, the lanthanoid elements and Hf are mapped to the same place. In addition, when the lanthanoid elements and an Al compound are added as sintering aids, the lanthanoid elements and Al are mapped to the same place.

The lanthanoid elements easily form a crystalline compound with other additive elements. When the concentration variation of the lanthanoid elements is small as described above, the respective compositions of the crystalline compounds existing in the grain boundary phases are close to each other. As compared with yttrium, the lanthanoid elements easily form a crystalline compound.

In addition, the lanthanoid element compound is a component that easily forms a crystalline compound with the Hf compound or Al compound. When a lanthanoid element compound and a Hf compound are added as sintering aids, the predominant component is the lanthanoid element-Hf—O crystalline compound. In addition, when a lanthanoid element and an Al compound are added, the predominant component is the lanthanoid element-Al—O crystalline compound. Further, when a lanthanoid element compound, a Hf compound, and an Al compound are added, the predominant component is the lanthanoid element-Hf—Al—O crystalline compound.

This is because the lanthanoid element has a melting point close to that of a crystalline compound formed by the reaction of Hf or Al and thus a crystalline compound having a small compositional deviation is formed. Hence, crystalline compounds having valences close to each other are formed. As a result, it is possible to form a grain boundary phase having a small compositional deviation. Among the lanthanoid elements, Yb, Er, Lu, and Ce have such phenomena in particular. In other words, it is preferable to use at least one selected from Yb, Er, Lu, and Ce as the lanthanoid element.

On the other hand, yttrium is liable to form crystalline compounds having different valences. Although addition of yttrium, Hf, and Al forms a grain boundary phase in which Y—Hf—Al—O crystal and Y—Al—O crystal coexists, the respective reaction temperatures of the two crystals are different from each other and thus the grain boundary phase is formed depending on the variation of the component distribution in the sintered body. For this reason, the grain boundary phase having large composition variation is formed. Incidentally, composition analysis of the grain boundary phase is possible by using an FE-SEM (Field Emission Scanning Electron microscope).

Partial variations in strength and oxidation resistance can be reduced by reducing the composition variation of the grain boundary phase. As a result, it is possible to realize a long life.

Further, it is preferable that α-sialon crystal particles are present in the sintered body. By making both β-silicon nitride crystal particles and α-sialon crystal particles exist, it provides a structure in which the α-sialon crystal particles are entered into the gaps between the β-silicon nitride crystal particles. When such a structure is formed, the maximum diameter of the grain boundary phase can be made 1 µm or less.

Further, the aspect ratio of the grain boundary phase may preferably be reduced to 1.5 or less. The aspect ratio of the grain boundary phase is measured by using the above-described color mapping. The longest diagonal line of the grain boundary phase appearing in color mapping is defined as the major diameter. The diagonal line extended perpendicularly from the center of the major diameter is defined as the minor diameter. The aspect ratio is defined as major diameter/minor diameter. The aspect ratio of individual grain boundary phases is preferably 1.5 or less.

Under the condition where the maximum diameter of the grain boundary phase is set to 1 µm or less, the aspect ratio can be reduced to 1.5 or less. Thereby, it is possible to obtain a grain boundary phase which is strong against a high-speed rotation.

The presence of β-silicon nitride crystal grains (particles) and α-sialon crystal grains can be analyzed by XRD. The measurement conditions of XRD are as follows: Cu target (Cu—Kα) is used; tube voltage is 40 kV; tube current is 40 mA; scan speed is 2.0°/min; slit (RS) is 0.15 mm; and scanning range (2θ) is 10° to 60°. As to the scanning range (2θ), it is also acceptable to enlarge the scanning range as long as it includes 10° to 60°.

An arbitrary cross-section of the silicon nitride sintered body is subjected to XRD observation. The cross-section to be measured is a polished surface having a surface roughness Ra of 1 μm or less. When β-silicon nitride crystal grains are present, peaks are detected at 33.6±0.3° and 36.1±0.3°. Additionally, when α-sialon crystal grains are present, peaks are detected at 29.6±0.3° and 31.0±0.3°.

Further, by allowing the β-silicon nitride crystal particles and α-sialon crystal particles to coexist, the friction coefficient of the sintered body can be improved.

In addition, as a combination of sintering aids to be added in the manufacturing process, the following combinations are preferable.

As a first combination, lanthanoid oxides, $MgO.Al_2O_3$ spinels, AK $HfO_2$, and $Mo_2C$ are added in contents of 0.2 to 5% by mass, 0.5 to 5% by mass, 2 to 6% by mass, 0.5 to 3% by mass, and 0.1 to 3% by mass, respectively. In the first combination, six components including the lanthanoid element, Mg, Al, Hf, Mo, and C are added as the additive components.

As a second combination, lanthanoid oxides, AlN, and $HfO_2$ are added in contents of 2 to 7% by mass, 3 to 7% by mass, and 0.5 to 4% by mass, respectively. In the second combination, the additive components are three including a lanthanoid, Al, and Hf.

As the third combination, lanthanoid oxides, $Al_2O_3$, AlN, and $TiO_2$ are added in contents of 1 to 10% by mass, 1 to 5% by mass, 1 to 5% by mass, and 0.1 to 3% by mass, respectively. In the third combination, the additive components are three including a lanthanoid, Al, and Ti.

Additionally, in the first to third combinations, the upper limit of the contained amount of the sintering aid components is set to 15% by mass or less in total.

The above-described first to third combinations are cases in which additive components preferable for lanthanoid elements are combined.

In each of the first and second combinations, any combination of adding $Al_2O_3$ is not used. When the additive components are added in the form of $Al_2O_3$, it tends to form any of $Al_5R_3O_{12}$, $Al_2R_4O_9$, and $AlRO_3$ wherein R indicates the lanthanoid element. Additionally, $Al_5R_3O_{12}$ is equivalent to YAG, $Al_2R_4O_9$ is equivalent to YAM, and $AlRO_3$ is equivalent to YAL. These crystals have poor durability at high temperatures. By excluding $Al_2O_3$ from the aspects of the additive components, it is possible to suppress formation of $Al_5R_3O_{12}$, $Al_2R_4O_9$, and $AlRO_3$.

Evaluating from these points, the first combination and the second combination are more preferable than the third combination. Further, the second combination is more preferable than the first combination.

When AlN (aluminum nitride) is added as Al compounds, a formation of grain boundary phases having different valences can be prevented, which makes it possible to form a grain boundary phase mainly composed of any one of the lanthanoid element-Hf—O crystalline compound, the lanthanoid element-Al—O crystalline compound, and the lanthanoid element-Hf—Al—O crystalline compound.

Further, when AlN is added as Al compound, it becomes easy to form a structure in which β-silicon nitride crystal grains and α-sialon crystal grains coexist.

The friction stir welding tool member is subjected to a high temperature state in which the temperature of the friction surface is 800° C. or higher. As the heat resistance decreases, the durability of the welding tool member decreases. It is possible to obtain a synergistic effect of strengthening oxidation resistance by lanthanoid elements and forming heat-resistant grain boundary phase by the combination of sintering aids.

The above-described silicon nitride sintered body can have an oxidation increase amount of $10 \times 10^{-5}$ wt %/cm² or less per 1 cm² of the surface area after being held in the atmosphere at a temperature of 1200° C. for 100 hours. Further, by preventing formation of any of the above-described $Al_5R_3O_{12}$, $Al_2R_4O_9$, and $AlRO_3$, the oxidation increase amount can be made $1 \times 10^{-5}$ wt %/cm² or less per 1 cm² of the surface area. As a result, it is possible to provide a tool member which is excellent in long-term life.

In addition, the above-described additive components also have a satisfactory function as a sintering aid. Thus, the proportion of β-type silicon nitride crystal grains having an aspect ratio of 2 or more can be increased to 60% or more. The proportion of the crystal grains having an aspect ratio of 2 or more to the total is obtained by the following procedure. That is, an arbitrary cross-section of the silicon nitride sintered body is observed by using an SEM and enlarged photographs (magnification of 3000 times or more) are obtained. The major diameter and minor diameter of the silicon nitride crystal grain depicted in the enlarged photographs are measured, and the aspect ratio is calculated. An area ratio (%) of silicon nitride crystal grains having an aspect ratio of 2 or more per unit area of 50 μm×50 μm is calculated.

In order to shorten the welding time of a member to be welded and to enhance the production efficiency, a friction stir welding apparatus is preferably operated by rotating the welding tool member (i.e., probe) at a rotation speed of 300 rpm or more and at an indentation load of 9.8 kN or more. The frictional heat produces a high temperature environment of 800° C. or higher in the temperature of the friction surface. Accordingly, the probe is required to have both heat resistance and wear resistance. Such a welding tool member made of a silicon nitride sintered body is required to have high Vickers hardness and a sufficient fracture toughness value.

Hence, Vickers hardness of the silicon nitride sintered body is preferably 1400 HV1 or more. In addition, the fracture toughness value of the silicon nitride sintered body is preferably 6.0 MPa·m$^{1/2}$ or more. It is more preferable that the Vickers hardness is 1450 HV1 or more and the fracture toughness value is 6.5 MPa·m$^{1/2}$ or more. Moreover, the three-point bending strength is preferably 900 MPa or more, and is further preferably 1000 MPa or more.

The friction stir welding tool member made of the above-described silicon nitride sintered body is excellent in heat resistance and wear resistance (durability). Thus, the rotational speed of the welding tool member can be set to 300 rpm or more, further 800 rpm or more. In addition, the indentation load can be increased to 9.8 kN or more, further to 20 kN or more. Hence, the friction stir welding tool member exhibits excellent durability even under severe use conditions where the temperature of the friction surface is 800° C. or higher. It should be noted that the welding tool member according to the embodiment may be used under the condition where the rotation speed is less than 300 rpm and the indentation load is less than 9.8 kN.

Figure 2:
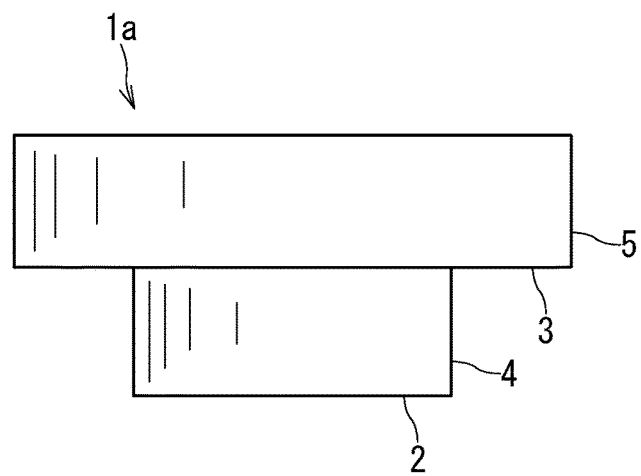
FIG. 2 is a side view illustrating a protruded-type friction stir welding tool member.
Figure 3:
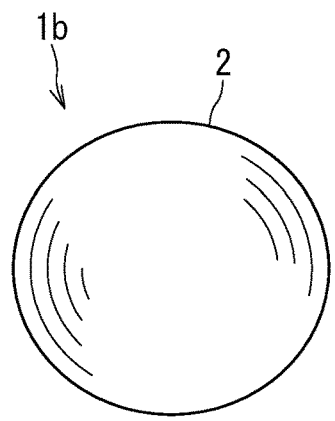
FIG. 3 is a perspective view illustrating a spherical-type friction stir welding tool member.

Although the shape of the welding tool member is not particularly limited, representative shapes are shown in FIG. 1, FIG. 2, and FIG. 3. In each figure, the reference sign 1 denotes a friction stir welding tool member made of a silicon nitride sintered body, the reference sign 2 denotes a friction surface, and the reference sign 3 denotes a shoulder portion.

FIG. 1 shows a columnar-type welding tool member 1. The flat surface of the column is the friction surface 2. FIG. 2 shows the protruded-type welding tool member 1a. The protruded-type welding tool member 1a has a shape in which a columnar protruded portion 4 is integrally formed on a columnar base portion 5. Further, the flat surface of the protruded portion 4 is the friction surface 2. As the welding tool member according to the embodiment, the base portion 5 and the protruded portion 4 are formed of silicon nitride sintered bodies. The surface of the base portion 5 is the shoulder portion 3. FIG. 3 is a spherical-type welding tool member 1b. In the spherical-type welding tool member 1b, the outer peripheral surface of the sphere functions as the friction surface 2.

Further, the friction surface 2 preferably has a surface roughness Ra of 5 μm or less. In the friction stir welding, the friction surface 2 is rotated at a high speed while being pressed against the member to be welded. For this reason, adhesion property (close-contacting property) to the pressing surface of the member to be welded (base material) is necessary. When the adhesion property is low, the frictional heat becomes difficult to be conducted to the mating member (i.e., the member to be welded to the base material). The surface roughness Ra is preferably 3 μm or less, more preferably 2.5 μm or less. When the surface roughness Ra exceeds 5 μm, not only the adhesion property decreases but also the surface asperity (irregularities) become excessive, and thereby the wear resistance may decrease.

Although the lower limit value of the surface roughness Ra is not particularly limited, the surface roughness Ra is preferably set to 0.01 μm or more. When the surface roughness Ra is as small as less than 0.01 μm, the adhesion property between the friction surface 2 and the welding member is improved but the stirring force of the friction surface 2 is lowered.

The stirring force of the friction surface means a force that plastically deforms (plastically flows) the member to be welded. When the stirring force is insufficient, the bonding force between the members to be welded decreases. In addition, it takes much time for plastic deformation of the members to be welded and there is a possibility that the welding time becomes long. Thus, the surface roughness Ra is preferably set to 0.01 to 5 μm, more preferably be set to 0.05 to 2.5 μm.

It is preferable that the maximum cross-section height Rt of the friction surface 2 is 20 μm or less. When the maximum cross-section height Rt exceeds 20 μm, the surface asperity (i.e., irregularities) becomes excessive and the durability of the friction surface 2 decreases. The welding tool member is a member that is pressed while being rotated at a high speed. The surface roughness Ra is the arithmetic average roughness. Even in a case where the surface is flat as the average value, when large unevenness (irregularity) exists in a micro-structural region, this large unevenness becomes a starting point of destruction (breakage). Thus, the maximum cross-section height Rt is preferably set to 20 μm or less, more preferably 15 μm or less. Although the lower limit of Rt is not particularly limited, the maximum cross-section height Rt is preferably set to 0.04 μm or more. When the maximum cross-section height Rt is less than 0.04, surface asperity becomes excessively small and the stirring force of the friction surface is lowered. Hence, the maximum cross-section height Rt is preferably set to 0.04 to 20 μm, more preferably 0.04 to 15 μm.

Measurement of the surface roughness Ra and measurement of the maximum cross-section height Rt are performed in accordance with conditions prescribed in JIS-B-0601. The measurement is performed under the condition where the cutoff-length is 0.8 mm.

In the case of the protruded-type welding tool member 1a as shown in FIG. 2, the surface roughness Ra of the shoulder portion 3 is preferably set to 10 μm or less and the maximum cross-section height Rt is preferably 60 μm or less. The shoulder portion 3 is the surface on the side where the friction surface 2 is provided in the base portion 5. In the case of the protruded-type welding tool member 1a, when the friction stir welding is performed, the protruded portion 4 provided with the friction surface 2 is embedded in the member to be welded. When the protruded portion 4 is deeply embedded in the member to be welded, the shoulder portion 3 is brought into contact with the member to be welded. By bringing the shoulder portion 3 into contact with the member to be welded, the stirring force is increased and plastic flow easily occurs. Thus, when each of Ra and Rt of the surface of the shoulder portion 3 is set to a predetermined range, it is possible to improve the wear resistance and the stirring force. It is preferable that Ra and Rt of the surface of the shoulder portion 3 are measured by moving a measurement needle (i.e., measurement needle of the surface roughness meter) from the inside to the outside (or from the outside to the inside of the shoulder portion 3).

Additionally or alternatively, when the surface roughness is controlled by surface grinding processing, measurement of the surface roughness is preferably performed by moving a measuring needle in the direction perpendicular to the grinding processing direction. Since the silicon nitride sintered body is a high hardness material, the grinding processing is performed as grinding with the use of a diamond grindstone or the like. For instance, as grinding processing while a diamond grind stone is being rotated at a high speed, lapping processing and polish processing are included. When the surface is ground along the rotation direction of the grindstone, a grinding trace is formed on the ground surface along the rotation direction of the grindstone. Consequently, the surface roughness in the direction perpendicular to the grinding direction is increased. The wear resistance and stirring force of the tool member can be further improved by controlling Ra and Rt of the shoulder portion under the condition where the measurement is performed by moving the measuring needle in the direction perpendicular to the grinding processing direction.

It is also effective to match the rotation direction of the protruded-type welding tool member 1a with the grinding direction of the shoulder portion 3.

Although the size of the welding tool member is arbitrary, it is preferable that the diameter of the friction surface 2 is 1 mm or more. In the case of the spherical probe 1b, the diameter of the friction surface is 1 mm or more. Since the probe according to the embodiment is made of a silicon nitride sintered body, the diameter of the friction surface 2 is preferably 1 mm or more and 50 mm or less, and is more preferably 2 mm or more and 25 mm or less. Within this range, the surface roughness Ra of the friction surface can be easily ground or polished to 5 μm or less.

The friction stir welding apparatus using the friction stir welding tool member made of the silicon nitride sintered body according to the embodiment as described above has high durability of the probe, and thus achieves high reliability and long life as an apparatus. In particular, even when the rotation speed is 300 rpm or more and the indentation load is as high as 9.8 kN or more, the probe shows excellent reliability. For this reason, the probe can exhibit an excellent durability even under a use environment with a friction surface temperature of 300° C. or higher. In addition, a sufficient welding strength can be obtained even when the welding time is short.

In addition, the probe can be applied as the friction stir welding (FSW) to any of spot welding and line welding. Further, the probe may be applied to the friction stir process (FSP) using friction stir. In other words, in the embodiment, it is assumed that the friction stir welding process (FSP) is included in the friction stir welding (FSW).

Next, a description will be given for a method of manufacturing the friction stir welding tool member made of silicon nitride sintered body according to the embodiment.

Although the manufacturing method of the friction stir welding tool member made of the silicon nitride sintered body according to the embodiment is not particularly limited as long as it has the above-described configuration, the following method is included as a method for efficiently obtaining the tool member.

First, silicon nitride powder is prepared. The silicon nitride powder is preferably an α-type silicon nitride powder having an average particle size of 2 μm or less. When such silicon nitride powder is used, the α-type silicon nitride powder is converted into the β-type silicon nitride in the sintering step, and thus the obtained sintered body is allowed to have a structure in which the β-type silicon nitride crystal grains are intricately intertwined. The contained amount of the impurity oxygen in the silicon nitride powder is preferably set to 2% by mass or less.

Next, a sintering aid power is prepared as an additive component including at least one element selected from the lanthanoid element, Mg, Ti, Hf, and Mo. Further, at least one component selected from Al, Si, and C is added, as needed.

The form of the addition of the sintering aid powder includes at least one selected from oxide powder (inclusive of composite oxides), nitride powder (inclusive of composite nitrides), carbide powder (inclusive of composite carbides), and carbonitride powder (inclusive of composite carbonitrides). The total amount of the sintering aid powder is adjusted to be 15% by mass or less. The average particle size of the sintering aid powder is preferably 3 μm or less.

The preferable combinations of the sintering aid powder are the above-described first to third combinations.

Next, the silicon nitride powder and the sintering aid powder were blended and then mixed with each other in a ball mill thereby to prepare a starting material powder. Next, an organic binder is added to the starting material powder, and then the molding step is performed. In the molding step, a molding die having an intended probe shape is preferably used. For the molding step, a die molding method, a CIP (cold isostatic pressing) method, or the like may be used.

Next, the molded body obtained in the molding step is degreased. The degreasing step is preferably performed by heating the molded body in nitrogen gas atmosphere at a temperature of 400° C. to 800° C.

Next, the degreased molded body obtained in the degreasing step is sintered. The sintering step is performed at a temperature of 1600° C. or higher. The sintering step is preferably performed in an inert gas atmosphere or in vacuum. As the inert gas atmosphere, a nitrogen gas atmosphere and/or an argon gas atmosphere may be used. The sintering step may be performed under a normal pressure sintering method, a pressure sintering method, or a HIP (hot isostatic pressing) method. Additionally or alternatively, plural sintering methods may be used in combination.

Although the upper limit of the sintering temperature is not particularly limited, it is preferably set to 1800° C. or lower. Sintering is possible even at temperatures above 1800° C. By making the sintering temperature within the range of 1600° C. to 1800° C., the reaction between the sintering additives can be made homogeneous, and consequently, it is possible to form a grain boundary phase having a small compositional deviation. The lower the sintering temperature is, the more homogeneous the reaction between the sintering additives becomes. Thus, the sintering temperature is preferably set in the range of 1600° C. to 1800° C., more preferably 1600° C. to 1700° C. In particular, it is preferable to perform the primary sintering at a temperature in the range of 1600° C. to 1800° C., more preferably 1600° C. to 1700° C. The primary sintering is a process of sintering a degreased body. The process of performing resintering on the sintered body produced in the primary sintering process is called the secondary sintering. In the production of the friction stir welding tool member, it is preferable that the secondary sintering is performed by HIP sintering. Due to the HIP sintering, it is possible to obtain a densified sintered body which has a small maximum diameter of the grain boundary phase.

The portion corresponding to the friction surface in the obtained sintered body is subjected to grinding (polishing) processing as required. The surface roughness Ra of the friction surface is made to be 5 μm or less by the grinding (polishing) processing. It is preferable that a diamond grindstone is used in the grinding processing. Further, in the case of the protruded-type welding tool member, the surface grinding processing of the shoulder portion is performed as needed. For portions excluding the friction surface and the shoulder portions, the grinding processing is performed as needed.

In addition, control of the surface roughness Ra and the maximum cross-section height Rt by grinding can be achieved by changing conditions of the grinding processing. For instance, there is a method in which the grinding processing is performed plural times by changing the particle size (i.e., surface roughness) of the diamond grind stone each time.

EXAMPLE

Examples 1 to 6 and Comparative Examples 1 and 2

As silicon nitride powder, an α-type silicon nitride powder having an average particle diameter of 1 μm was prepared. Next, as the sintering aid powder, those shown in Table 1 were prepared.

TABLE 1

| Sample No. | Added Sintering Aid Powder (Mass %) | Total Amount of Sintering Aid Powder (Mass %) |
|---|---|---|
| Example 1 | $Yb_2O_3$ (3.0), $MgO \cdot Al_2O_3$ (2.0), AlN (4.0), $HfO_2$ (2.0), $Mo_2C$ (0.6) | 11.6 |
| Example 2 | $Lu_2O_3$ (4.0), $MgO \cdot Al_2O_3$ (1.0), AlN (3.0), $HfO_2$ (1.0), $Mo_2C$ (1.0) | 10 |
| Example 3 | $Yb_2O_3$ (5.0), AlN (5.0), $HfO_2$ (1.5) | 11.5 |
| Example 4 | $Er_2O_3$ (4.0), AlN (4.0), $HfO_2$ (1.0), SiC (1.0) | 10 |
| Example 5 | $CeO_2$ (3.0), AlN (3.0), $HfO_2$ (1.0), $Mo_2C$ (1.0) | 8 |
| Example 6 | $Yb_2O_3$ (4.0), $Al_2O_3$ (3.0), AlN (4.0), $TiO_2$ (1.0) | 12 |
| Comparative Example 1 | $Y_2O_3$ (4.0), $Al_2O_3$ (3.0), AlN (4.0), $TiO_2$ (1.0) | 12 |
| Comparative Example 2 | $Y_2O_3$ (5), $Al_2O_3$ (2), cBN (15) | 20 |

Each raw material powder was prepared by blending the silicon nitride powder and the sintering aid powder. Next, after uniformly mixing the raw material powder by means of a ball mill, an organic binder was mixed at 2% by mass. Thereafter, CIP molding was performed to produce a rod-shaped molded body, and then the molded body was subjected to a green-processing so as to form a protruded shape as shown in FIG. 2.

Next, a normal pressure sintering was performed with respect to the protruded molded body in a nitrogen atmosphere at a temperature of 1600° C. to 1800° C. for 5 hours. Thereafter, HIP sintering was performed at a temperature of 1700° C. for 2 hours. The shape of the protruded-type probe is as shown in FIG. 2, the base portion 5 has a diameter of 20 mm×thickness of 20 mm, and the protruded portion 4 has a diameter of 10 mm×thickness of 5 mm.

The obtained sintered bodies were subjected to investigation as to presence/absence of α-sialon crystal grains, the maximum diameter of the grain boundary phase, and whether or not the compositional deviation of the lanthanoid element was 20% or less.

The presence/absence of α-sialon crystal grains was analyzed by XRD under the measurement conditions as follows: Cu target (Cu—Kα) is used; tube voltage is 40 kV; tube current is 40 mA; scan speed is 2.0°/min; slit (RS) is 0.15 mm; and scanning range (2θ) was between 10° and 60°. Further, an arbitrary cross section of the silicon nitride sintered body was polished so as to have a surface roughness Ra of 1 μm or less, and then this polished surface was subjected to XRD observation. When α-sialon crystal grains are present, peaks are detected at 29.6±0.3° and 31.0±0.3°. Each sample for which those peaks were detected is indicated as "observed" (meaning that α-sialon crystal particles are present), and each sample for which those peaks were not detected is indicated as "none".

TEM analysis and EDS analysis were performed on the investigation as to the maximum diameter of the grain boundary phase and whether or not the compositional deviation of the lanthanoid element is 20% or less. In the TEM analysis, a specimen having a carbon coat on the surface of a sample (thickness 30 μm) being cut out from an arbitrary cross-section of a silicon nitride sintered body was used as a measurement specimen. Color mapping of lanthanoid elements in a unit area of 5 μm×5 μm was performed on an arbitrary cross-section. An enlarged photograph with a magnification of 2000 times or more was used. The longest diagonal line of each lanthanoid element region depicted in the unit area of 5 μm×5 μm is defined as the maximum diameter, and the longest value in the unit area is shown as the maximum diameter of the grain boundary phase. By using the color mapping function of the lanthanoid element, the unit area of 5 μm×5 μm was investigated as to presence/absence of a grain boundary phase in which deviation of the lanthanoid element concentration exceeds 20%. Each sample in which the compositional deviation of lanthanoid elements was 20% or less is indicated as "○", and each sample in which the compositional deviation exceeds 20% is indicated as "x". In the Comparative Examples 1 and 2, yttrium element was analyzed instead of the lanthanoid element.

In addition, the aspect ratio of each grain boundary phase was determined by using the above-described color mapping image. In the calculation of the aspect ratio, the longest diagonal line of each grain boundary phase was defined as the major diameter, the diagonal line vertically extended from the center of this major diameter was defined as the minor diameter, and the aspect ratio was determined as a ratio of the major diameter/minor diameter.

The results are shown in Table 2 hereunder.

TABLE 2

| Sample No. | Presence/Absence of α-Sialon Crystal Grains | Maximum Diameter of Grain Boundary Phase (μm) | Compositional Deviation of Lanthanoid Elements is 20% or less | Aspect Ratio of Grain Boundary Phase |
|---|---|---|---|---|
| Example 1 | Observed | 0.5 | ○ | 1.5 or less |
| Example 2 | Observed | 0.7 | ○ | 1.5 or less |
| Example 3 | Observed | 0.4 | ○ | 1.5 or less |
| Example 4 | Observed | 0.7 | ○ | 1.5 or less |
| Example 5 | Observed | 0.9 | ○ | 1.5 or less |
| Example 6 | Observed | 0.5 | ○ | 1.5 or less |
| Comparetive Example 1 | Observed | 1.7 | x | 2.4 or more |
| Comparative Example 2 | None | 2.9 | x | 2.4 or more |

As is clear from the results shown in Table 2, α-sialon crystal grains were present in the silicon nitride sintered bodies according to the respective examples. Since peaks were detected at 33.6±0.3° and 36.1±0.3°, it was also confirmed that β-silicon nitride crystal grains coexisted. The maximum diameter of the grain boundary phase was 1 μm or less. Additionally, the compositional deviation was within 20%.

When the mapping was further performed for elements other than the lanthanoid elements, Hf (hafnium), Al (aluminum) and O (oxygen) were detected at the same place as the lanthanoid elements. Thus, it was confirmed that the individual grain boundary phases were predominantly composed of the lanthanoid element-Hf—Al—O crystalline compound.

In the silicon nitride sintered body of each example, the aspect ratio of the grain boundary phase was 1.5 or less. On the other hand, in the Comparative Examples, portions with an aspect ratio of 2.4 or more were observed.

Next, the portion corresponding to the friction surface 2 of each of the obtained sintered bodies was polished by using a diamond grind stone. The surface roughness Ra after this polishing was set to 2 μm. In addition, the maximum cross-section height Rt of the friction surface 2 was 8 μm.

In each Example and Comparative Example, the shoulder portion 3 was also subjected to the polishing processing. As a result, the surface roughness Ra of the shoulder portion 3 was 5 μm and the maximum cross-section height Rt was 13 μm.

Measurement of each of Ra and Rt was performed with a cutoff length of 0.8 mm in accordance with JIS-B-0601. As to the measurement of the surface roughness of the shoulder portion 3, Ra and Rt were measured while the measuring needle was being moved from the inside to the outside. By performing such a method, friction stir welding tool members made of the silicon nitride sintered bodies according to the respective Examples and Comparative Examples were prepared.

Next, Vickers hardness, a fracture toughness value, three-point bending strength, oxidation increase, and a friction coefficient were measured for the friction stir welding tool member made of the silicon nitride sintered body according to each of the Examples and Comparative Examples. The Vickers hardness was measured in accordance with JIS-R 1610, and the fracture toughness value was measured in accordance with JIS-R-1607. The fracture toughness value was calculated on the basis of an IF method by using Niihara's equation. The oxidation increase was defined as the weight of oxidation increase converted in terms of surface area of 1 $cm^2$ after holding the silicon nitride sintered body in the atmosphere at 1200° C. for 100 hours.

Measurement of the friction coefficient was performed by reciprocally sliding a pin having a spherical tip on a flat plate. The measurement conditions were as follows; reciprocating sliding speed is 20 mm/sec; room temperature; in the atmosphere; and no lubrication. The surface roughness Ra of the spherical surface of the pin was 0.1 μm and the surface roughness Ra of the flat plate was 0.3 μm. The surface of the flat plate was ground in the direction perpendicular to the sliding direction, and the measurement of the surface roughness was performed in the sliding direction. The pin and flat plate are made of the same material. For instance, in the case of the Example 1, the pin and the flat plate are formed by using the silicon nitride sintered body of the Example 1.

The measurement results are shown in Table 3 below.

TABLE 3

| Sample No. | Vickers Hardness (HV) | Fracture Toughness Value (MPa · $m^{1/2}$) | Oxidation Increase (wt %/$cm^2$) | Friction Coefficient |
| --- | --- | --- | --- | --- |
| Example 1 | 1550 | 6.6 | 2.2 × $10^{-5}$ | 0.7 |
| Example 2 | 1590 | 6.5 | 1.3 × $10^{-5}$ | 0.6 |
| Example 3 | 1650 | 6.7 | 0.7 × $10^{-5}$ | 0.7 |
| Example 4 | 1750 | 6.7 | 0.5 × $10^{-5}$ | 0.6 |
| Example 5 | 1760 | 6.8 | 0.4 × $10^{-5}$ | 0.6 |
| Example 6 | 1510 | 6.5 | 5.5 × $10^{-5}$ | 0.7 |
| Comparative Example 1 | 1480 | 6.5 | 13.6 × $10^{-5}$ | 0.5 |
| Comparative Example 2 | 1700 | 7.0 | 12.2 × $10^{-5}$ | 0.4 |

The silicon nitride sintered bodies according to the respective Examples exhibited excellent characteristics in terms of Vickers hardness, fracture toughness, oxidation resistance, and friction coefficient. In every Example, the oxidation increase was 10×$10^{-5}$ wt %/$cm^2$ or less.

The friction coefficient was 0.6 or more. The coefficient of friction is indicated by μ=F/P, wherein F is the frictional force, μ is the friction coefficient, and P is the load. The smaller the friction coefficient is, the smoother the surface becomes. A friction coefficient of 0.6 or more indicates that the frictional force is higher than that of the Comparative Examples. A higher frictional force leads to improvement in friction stirring force.

Next, a durability test was performed with respect to the welding tool members according to the respective Examples and Comparative Examples. As the durability test, a cold rolled steel plate (thickness 1.0 mm) and a cold rolled steel plate (thickness 1.0 mm) were welded by the friction stir welding. The welding tool members according to the respective Examples and the Comparative Examples were set in a friction stir welding apparatus, and a durability test of 2000 cycles was performed. In the welding process, one cycle was defined as the operation of pressing the welding tool member at the rotation speed (rpm) shown in Table 4 for 4 seconds to weld the objects.

Regarding acceptance or rejection of the durability test as the welding tool member, a tensile shear test of the cold rolled steel plate welded by the friction stir welding at the 2000th cycle was performed, and it was determined as acceptable when the tool member indicated A-grade tensile strength (kN) stipulated in JIS-Z-3140 in the tensile shear test.

Further, the durability test was performed by changing the pressing conditions as shown in Table 4. The test results are shown in Table 5 below.

TABLE 4

| Test Condition 1 | | Test Condition 2 | |
| --- | --- | --- | --- |
| Rotation Speed (rpm) | Welding Time (second) | Rotation Speed (rpm) | Welding Time (Second) |
| 1000 | 4 | 1600 | 4 |

TABLE 5

| Sample No. | Test Condition 1 | Test Condition 2 |
| --- | --- | --- |
| Example 1 | 6.3 kN Acceptable | 5.9 kN Acceptable |
| Example 2 | 6.5 kN Acceptable | 6.0 kN Acceptable |
| Example 3 | 6.5 kN Acceptable | 6.2 kN Acceptable |
| Example 4 | 6.3 kN Acceptable | 6.1 kN Acceptable |
| Example 5 | 6.0 kN Acceptable | 5.7 kN Acceptable |
| Comparative Example 1 | 6.0 kN Acceptable | 5.2 kN Rejected |
| Comparative Example 2 | 4.0 kN Rejected | 2.5 kN Rejected |

As is clear from the results shown in the above Table 5, the welded tool members according to the respective Examples showed excellent durability. Further, as is clear from the comparison with the Comparative Example 2, it was found that durability as a friction stir welding tool member is lowered despite high Vickers hardness and a high fracture toughness value when the amount of the sintering aid components exceeds 15% by mass. This is because improvement in oxidation resistance and friction coefficient worked.

Examples 7 to 11

The welding tool member of the Example 3 was subjected to surface polishing so as to have the surface roughness shown in Table 6. The method of measuring the surface roughness is the same as in the Example 3.

TABLE 6

| Sample No. | Friction Surface | | Shoulder Portion | |
| --- | --- | --- | --- | --- |
| | Ra (μm) | Rt (μm) | Ra (μm) | Rt (μm) |
| Example 3 | 2 | 8 | 5 | 13 |
| Example 7 | 0.03 | 1.4 | 0.06 | 2.6 |
| Example 8 | 1 | 4 | 2 | 8 |
| Example 9 | 4 | 8 | 6 | 19 |
| Example 10 | 5 | 13 | 11 | 33 |
| Example 11 | 8 | 23 | 15 | 60 |

The durability test and measurement of tensile strength of the friction stir welded portion were performed on the welding tool members according to the respective Examples 7 to 11 under the same conditions as in the Example 3. The measurement results are shown in Table 7 below.

TABLE 7

| Sample No. | Test Condition 1 | Test Condition 2 |
| --- | --- | --- |
| Example 3 | 6.5 kN Acceptable | 6.2 kN Acceptable |
| Example 7 | 5.9 kN Acceptable | 5.5 kN Acceptable |
| Example 8 | 6.7 kN Acceptable | 6.5 kN Acceptable |
| Example 9 | 6.6 kN Acceptable | 6.3 kN Acceptable |
| Example 10 | 6.0 kN Acceptable | 5.5 kN Acceptable |
| Example 11 | 5.4 kN Acceptable | 4.0 kN Rejected |

In the Examples 6 to 10, the surface roughness Ra of the friction surface is 5 μm or less, Rt is 20 μm or less, the surface roughness Ra of the shoulder portion is 10 μm or less, and Rt is 60 μm or less. As is clear from the results shown in Table 7, it was found that the Examples 6 to 10 exhibit excellent durability.

The Example 11 having a large surface roughness was rejected when the test conditions were severe. This is because a durability of the tool-member surface was reduced and thereby the stirring force was reduced. As described above, it was found that the performance of the welding tool member improves by performing not only control of the sintering aid amount in the silicon nitride sintered body but also control of the surface roughness in combination.

Next, the long-term life of each friction stir welding tool member was measured. With respect to the respective tool members of the Examples 1 to 11 and Comparative Examples 1 and 2, the bonding strength after 5000 cycles was measured under the test condition 1 (i.e., rotation speed is 1000 rpm, welding time is 4 seconds).

The measurement results are shown in Table 8 below.

TABLE 8

| Sample No. | Test Condition 1 (After 2000 Cycles) | Test Condition 2 (After 5000 Cycles) |
| --- | --- | --- |
| Example 1 | 6.3 kN Acceptable | 5.4 kN Acceptable |
| Example 2 | 6.5 kN Acceptable | 5.7 kN Acceptable |
| Example 3 | 6.5 kN Acceptable | 6.0 kN Acceptable |
| Example 4 | 6.3 kN Acceptable | 5.9 kN Acceptable |
| Example 5 | 6.0 kN Acceptable | 5.9 kN Acceptable |
| Comparative Example 1 | 6.0 kN Acceptable | 4.6 kN Rejected |
| Comparative Example 2 | 4.0 kN Rejected | Not Weldable |
| Example 7 | 5.9 kN Acceptable | 5.0 kN Acceptable |
| Example 8 | 6.7 kN Acceptable | 5.8 kN Acceptable |
| Example 9 | 6.6 kN Acceptable | 6.0 kN Acceptable |
| Example 10 | 6.0 kN Acceptable | 5.2 kN Acceptable |
| Example 11 | 5.4 kN Acceptable | 4.0 kN Rejected |

As is clear from the results shown in Table 8, the tool members according to the respective Examples were excellent in long-term life. This is because the oxidation resistance and friction coefficient of the silicon nitride sintered body are improved.

Several embodiments of the present invention are illustrated above. However, these embodiments are presented by way of example only and not intended to limit the scope of the invention. These novel embodiments can be implemented in other various forms. Various omissions, substitutions, alterations, and the like of the embodiments can be made without departing from the gist of the invention. These embodiments and modifications thereof are included in the scope and the gist of the invention and included in the inventions described in claims and a scope of equivalents of the inventions. The embodiments described above can be implemented in combination with one another.

REFERENCE SIGNS LIST

1 (columnar-type) friction stir welding tool member
1a (protruded-type) friction stir welding tool member
1b (spherical-type) friction stir welding tool member
2 friction surface
3 shoulder portion
4 protruded portion
5 base portion

The invention claimed is:

1. A friction stir welding tool member made of a silicon nitride sintered body, wherein the silicon nitride sintered body contains 15% by mass or less of additive components except silicon nitride in such a manner that the additive components include at least one element selected from lanthanoid elements and at least one element selected from Mg, Ti, Hf or Mo;
  the lanthanoid element is contained in an amount of 1 to 10% by mass when a lanthanoid element contained in the silicon nitride sintered body is converted into a metal simple substance of the lanthanoid element; and
  both β-silicon nitride crystal particles and α-sialon crystal particles exist in the silicon nitride sintered body.

2. The friction stir welding tool member made of a silicon nitride sintered body according to claim 1, wherein one or more element selected from Al, Si, or C is further included as the additive components.

3. The friction stir welding tool member made of a silicon nitride sintered body according to claim 1, wherein the lanthanoid element is at least one element selected from Yb, Er, Lu or Ce.

4. The friction stir welding tool member made of a silicon nitride sintered body according to claim 1, wherein a maximum diameter of a grain boundary phase of the silicon nitride sintered body is 1 μm or less.

5. The friction stir welding tool member made of a silicon nitride sintered body according to claim 1,
  wherein variation of lanthanoid element concentration of individual grain boundary phases is within ±20% with respect to an average value acquired by concentration values of the lanthanoid elements in individual grain boundary phases that are present in a unit area of 5 μm×5 μm in structure of the silicon nitride sintered body, when concentration distribution of the lanthanoid elements in individual grain boundary phases is analyzed by TEM analysis for the unit area.

6. The friction stir welding tool member made of a silicon nitride sintered body according to claim 1, wherein an aspect ratio of a grain boundary phase of the silicon nitride sintered body is 1.5 or less.

7. The friction stir welding tool member made of a silicon nitride sintered body according to claim 1, wherein the silicon nitride sintered body has an oxidation increase of $10\times10^{-5}$ wt %/cm$^2$ or less per 1 cm$^2$ of a surface area after being held at 1200° C. in atmosphere for 100 hours.

8. The friction stir welding tool member made of a silicon nitride sintered body according to claim 1, wherein a surface roughness Ra of a friction surface of the silicon nitride sintered body is 5 μm or less.

9. A friction stir welding apparatus on which the friction stir welding tool member made of a silicon nitride sintered body according to claim 1 is mounted.

10. A friction stir welding method in which the friction stir welding apparatus according to claim 9 is used, the friction stir welding method comprising:
  superimposing two or more materials to be welded each other; and
  pressing the friction stir welding tool member against the materials to be welded while the friction stir welding tool member is being rotated at a rotation speed of 300 rpm or more.

11. The friction stir welding method according to claim 10, wherein the materials to be welded are steel.

12. The friction stir welding tool member made of a silicon nitride sintered body according to claim 1, wherein the silicon nitride sintered body has a Vickers hardness of 1590 or more.

13. The friction stir welding tool member made of a silicon nitride sintered body according to claim 1, wherein
  one or more element selected from Al, Si, or C is further included as the additive components,
  the lanthanoid element is at least one element selected from Yb, Er, Lu or Ce, and
  the silicon nitride sintered body has a Vickers hardness of 1590 or more.

14. The friction stir welding tool member made of a silicon nitride sintered body according to claim 1, wherein
  one or more element selected from Al, Si, or C is further included as the additive components,
  the lanthanoid element is at least one element selected from Yb, Er, Lu or Ce,
  a maximum diameter of a grain boundary phase of the silicon nitride sintered body is 1 μm or less, and
  the silicon nitride sintered body has a Vickers hardness of 1590 or more.

* * * * *